US005619627A

United States Patent [19]

Soderberg et al.

[11] Patent Number: 5,619,627
[45] Date of Patent: Apr. 8, 1997

[54] MULTIPLE-LEVEL OCCULTING USING A MASK BUFFER

[75] Inventors: Brian T. Soderberg, Woodinville; Dale D. Miller; Henrik Lind, both of Seattle; Richard Jarvis, Everett; Mark Kenworthy, Duvall, all of Wash.

[73] Assignee: Loral Aerospace Corp., New York, N.Y.

[21] Appl. No.: 237,285

[22] Filed: May 3, 1994

[51] Int. Cl.$^6$ .................................................. G06T 15/10
[52] U.S. Cl. ........................ 395/121; 395/119; 395/122
[58] Field of Search .................................. 395/121, 122, 395/141, 119, 123, 127, 124, 161, 162, 163; 345/24; 380/278, 282, 283

[56] References Cited

U.S. PATENT DOCUMENTS

| | | | |
|---|---|---|---|
| 4,865,423 | 9/1989 | Doi | 364/514 |
| 4,918,626 | 4/1990 | Watkins et al. | 395/121 |
| 4,924,414 | 5/1990 | Ueda | 395/122 |
| 5,088,054 | 2/1992 | Paris, II | 395/121 |
| 5,249,254 | 9/1993 | Matsumoto | 318/603 |
| 5,265,198 | 11/1993 | Gonzalez-Lopez et al. | 395/122 |
| 5,303,340 | 4/1994 | Gonzalez-Lopez et al. | 395/141 |
| 5,369,734 | 11/1994 | Suzuki et al. | 395/121 |
| 5,493,643 | 2/1996 | Soderberg et al. | 395/162 |
| 5,509,110 | 4/1996 | Latham | 395/121 |
| 5,542,032 | 7/1996 | Pritt | 395/121 |

OTHER PUBLICATIONS

Gordon et al., "Front–to–Back Display of BSP Trees", IEEE *Computer Graphics and Application Magazine*, vol. 11 issue 5, Sep. 1991, pp. 79–85.

Foley et al., *Computer Graphics: Principles and Practice*, Addison–Wesley Publishing Company, 1990, pp. 649–675, 680–687.

IBM Technical Disclosure Bulletin, vol. 32, No. 1, Jun. 1989, New York US, pp. 326–328, XP 000033187, "Screen Updating Method".

*Primary Examiner*—Heather R. Herndon
*Assistant Examiner*—Stephen Hong
*Attorney, Agent, or Firm*—Anthony W. Karambelas

[57] ABSTRACT

Occulting apparatus for use with an image generator that provides for multiple-level occulting of image data. The occulting apparatus comprises a mask buffer and control logic for processing image data to construct and store an obscurance mask in the mask buffer. Foreground entities contained in the image data are logically ORed into the mask buffer until the entities extend beyond a predefined range from a predetermined image viewpoint. Thereafter, the mask is used by the control logic to reject entities contained in subsequently processed image data that are fully obscured by the foreground entities comprising the obscurance mask. The control logic includes an obscurance manager, a region processor, an object processor, a polygon processor, and insertion logic. The obscurance manager is a controller for building and applying the obscurance mask to the image data. The region, object, and polygon processors respectively process regions, objects, and polygons in the image to determine if they are obscured, reject obscured entities, and transmits unobscured entities to subsequent processors. The insertion logic processes unobscured polygons and applies them to the obscurance manager for storage and use by the respective region, object, and polygon processors. The present invention performs real-time occulting of all objects in an image scene, whether they are fixed or moving. Hidden area modules (large groups of objects in a geographic region), single objects, polygons, and pixels are sequentially filtered-out in real-time. The mask buffer and control logic provide three levels of occulting. A hybrid Z-buffer 51 provides pixel-level occulting. The present invention rejects regions, objects, and polygons, early in the graphics processing pipeline to reduce the number of required pixel processing computational elements in the image generator. By rendering objects generally from front to back, entities that are completely hidden by nearer objects can be detected and discarded before tiling and pixel processing.

8 Claims, 3 Drawing Sheets

# MULTIPLE-LEVEL OCCULTING USING A MASK BUFFER

BACKGROUND

The present invention relates to image generation, and more particularly, to apparatus that provides for multiple level occulting using a mask buffer that may be employed in an image generator.

One problem relating to image generation is that conventional visual systems suffer image or frame rate degradation as a function of the height of a vantage point above a terrain surface or the number of moving models present in an image scene. In addition, conventional visual systems suffer frame rate degradation as a function of environment complexity such as viewing within a complex urban setting. In regions of an image containing rugged terrain or many cultural features, depth complexity increases significantly as the height of the eye (or viewing) point approaches the terrain surface. This is a fundamental reason that image generators designed for use as flight simulators suffer pixel overload in ground applications.

Visual systems that are optimized for use as air vehicle simulators solve polygon occulting problems off-line for fixed objects such as land, natural features, and cultural features. One frequently used polygon sorting technique is generally known as a binary separation plane method. If all objects are fixed, this technique is excellent for complex, ground based scenes. However, when faced with moving models, such approaches must then augment the off-line occulting process with a pixel-level occulting process such as Z- or R- buffering. Because such an architecture is not optimized for extensive real-time occulting, frame rate reduction may be used to resolve depth complexity when faced with many moving models. A slower and irregular frame rate has potential for a negative training impact, especially for gunnery tasks, since gunnery is a task during which a large number of moving targets can be expected to predominate in the scene.

The frame rate of an image generator using mixed occulting including off-line binary separation plane and real-time R-buffer techniques degrades as the number of dynamic objects in the scene increases. There is a relatively rapid fall-off in frame rate as the dynamic object content increases beyond its design point, typically about 30%. If the image generator is to be modified to handle a much larger percentage of moving models, the pixel processor and bus structure must be dramatically upgraded. As such, the image generator may as well be designed for 100% real-time occulting from the start.

Therefore, it is an objective of the present invention to provide for apparatus for use with an image generator that performs real-time occulting of all objects, whether fixed or moving.

SUMMARY OF THE INVENTION

In order to meet the above and other objectives, the present invention is an occulting apparatus for use with an image generator that provides for multiple-level occulting using a mask buffer having control logic. The present invention performs real-time occulting of all objects in an image scene, whether they are fixed or moving. Multiple-level occulting is used herein to mean that hidden area modules (large groups of objects in a geographic region), single objects, polygons, and pixels are sequentially filtered-out in real-time. The mask buffer operates in a polygon processor of the image generator to provide initial levels of occulting under control of the control logic. A hybrid Z-buffer operates in a pixel processor of the image generator to provide pixel-level occulting.

More specifically, the occulting apparatus includes the mask buffer, the control logic and the hybrid Z-buffer that provides for pixel occulting. The control logic includes an obscurance manager coupled to the mask buffer that is used to construct and store an obscurance mask in the mask buffer. Three levels of occulting are performed by a region processor, an object processor, and a polygon processor that sequentially process image data to provide the respective levels of occulting. The region processor processes polygons contained within the image to determine if regions are obscured, removes obscured regions from the processing pipeline, and transmits unobscured regions to the object processor. The object processor processes objects contained within the unobscured regions to determine if they are obscured, removes obscured objects from the processing pipeline, and transmits unobscured objects to the polygon processor. The polygon processor processes polygons contained within the unobscured objects to determine if polygons are obscured, removes obscured polygons from the processing pipeline, and transmits unobscured polygons to the hybrid Z-buffer. Insertion logic is coupled to the polygon processor and to the obscurance manager for processing unobscured polygons and coupling them to the obscurance manager which builds the obscurance mask in the mask buffer. The hybrid Z-buffer comprises pixel occulting apparatus that processes pixels contained within the unobscured polygons to determine if they are obscured, removes obscured pixels from the processing pipeline, and transmits unobscured pixels to a video generator for display.

It has been observed during distributed simulation testing, that an image generator can experience excessive pixel load conditions. However, during high loads as much as 75% of the pixels were actually obscured from view by nearer objects. This observation resulted in the present invention which provides for apparatus that rejects obscured objects as early as possible in the graphics processing pipeline provided in order to reduce the number of required pixel processing computational elements in the image generator. By rendering objects generally from front to back, entities that are completely hidden by nearer objects are detected. For maximum efficiency, this high level occulting is performed at three levels: regions, objects and polygons. Final, pixel-level occulting is performed with the hybrid. Z-buffer. This sequence accounts for the multiple levels of occulting.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
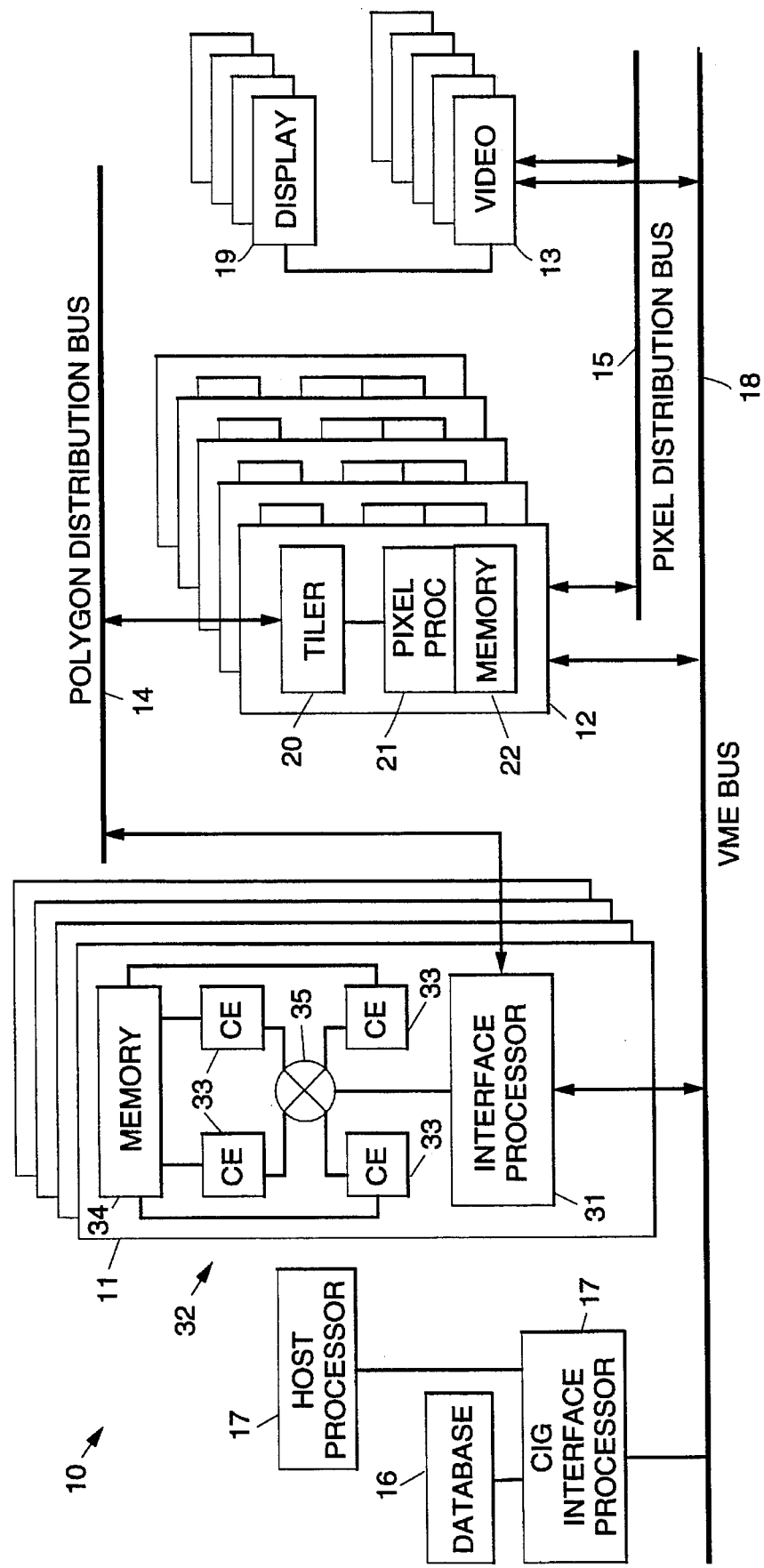
FIG. 1 illustrates an image generator employing multiple-level occulting using a mask buffer in accordance with the present invention.

Referring to the drawing figures, FIG. 1 illustrates an image generator 10 employing multiple-level occulting using a mask buffer 50 (FIG. 2) in accordance with the present invention. The image generator 10 is comprised of a polygon processor 11, a texture tiling pixel processor 12, a video generator 13, a database 16, and a computer image generator (CIG) interface processor 17. The video generator 13 is coupled to one or more video displays 19. The image generator 10 includes three busses, including a polygon distribution bus 14, a pixel distribution bus 15 and a standard bus 18, such as a VME bus 18, for example.

The polygon processor 11 includes four computational elements (CE) 33 interconnected by way of a crossbar switch 35. Each of the computational elements 33 are coupled to a memory 34, and the computational elements 33 are coupled to an interface processor 31. The interface processor 31 is employed to communicate with other processors of the 10 by way of the VME and polygon distribution busses 18, 14. The interface processor 31 also responds to commands and queries from a simulation host processor 25.

The CIG interface processor 17, polygon processor 11, texture tiling pixel processor 12, and video generator 13 are coupled to the VME bus 18. The interface processor 31 in the polygon processor 11 is coupled to the polygon distribution bus 14 along with the texture tiling pixel processor 12. The texture tiling pixel processor 12 and the video generator 13 are coupled to the pixel distribution bus 15.

The texture tiling pixel processor 12 comprises a tiler 20 that is coupled to a plurality of pixel processors 21 and a memory 22. The texture tiling pixel processor 12 along with the entire image generator 10 is described in more detail in copending U.S. patent application Ser. No. 08/237,286, filed May 3, 1994, entitled "Image Generation Architecture Employing Tri-Level Fixed Interleave Processing and Distribution Busses", now U.S. Pat. No. 5,493,643 assigned to the assignee of the present invention, the contents of which are incorporated herein by reference.

As is disclosed in this application, the tiler 20 comprises a texture processor that is coupled to a texture memory, a bilinear interpolator, a texture address generator, a texture index memory, the plurality of pixel processors 21 that are interconnected to a plurality of frame buffers, a built-in-test (BIT) processor, and a display switch. The texture and texture index memories correspond to the memory 22 described herein. The video generator 13 is comprised of a line buffer, a digital to analog converter, an overlay processor, a BIT processor, and a display switch. The line buffer is coupled to the pixel distribution bus 15 and the bit processor is coupled to the VME bus 18. The digital to analog converter is coupled to the display 19.

As is illustrated in FIG. 1, the polygon processor 11 processes polygons transferred to it from the database 16 by way of the CIG interface processor 17. The computational elements 33 process the polygons and the interface processor 31 transfers the processed polygons to the tiler 20 by way of the polygon distribution bus 14. The transferred polygons are processed by the tiler 20 and pixel processors 21 and the processed pixels are transferred by way of the pixel distribution bus 15 to the video generator 13 which processes the pixels for viewing on the display 19.

Figure 2:
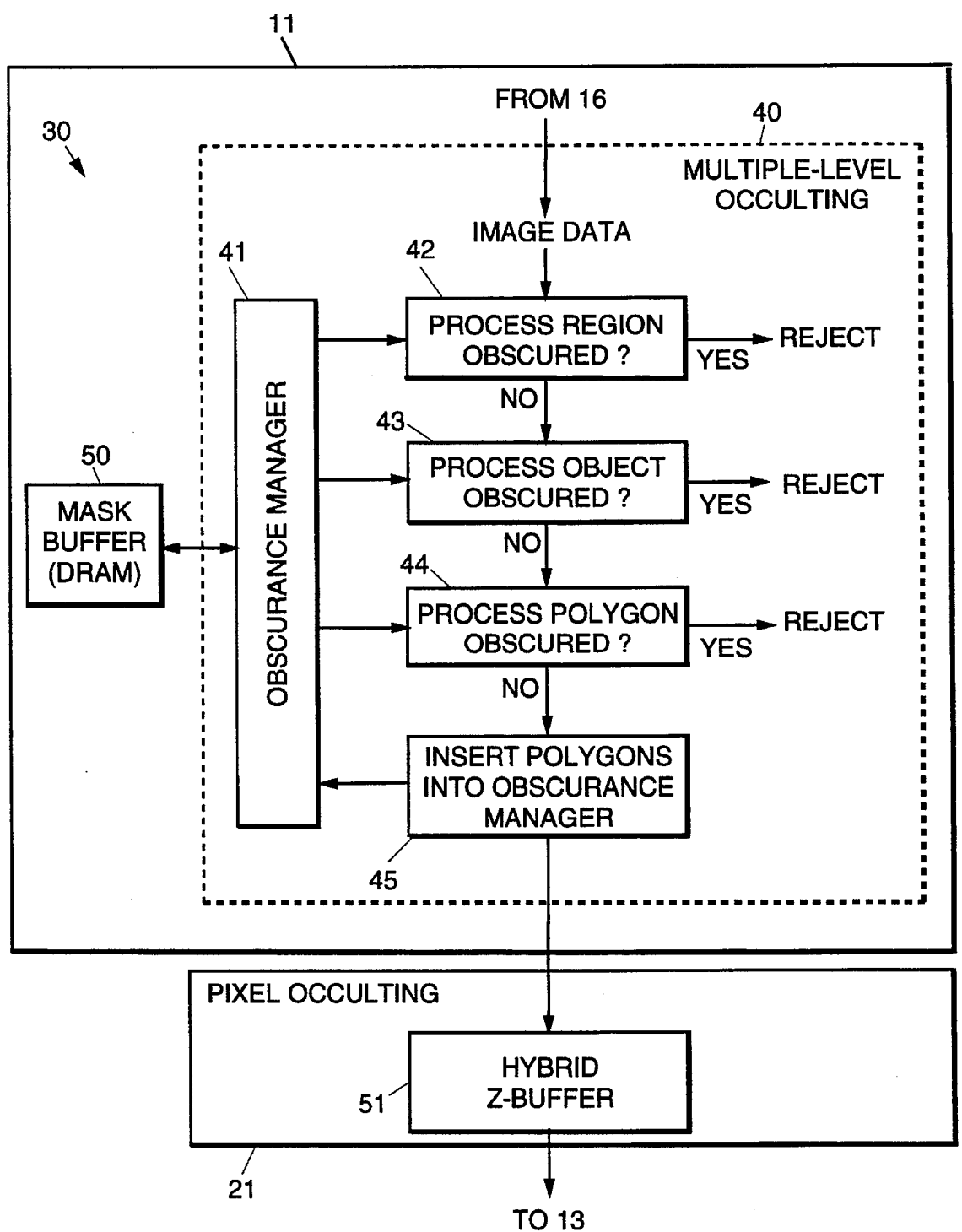
FIG. 2 illustrates multiple-level occulting using a mask buffer in accordance with the present invention.

FIG. 2 illustrates occulting apparatus 30 for use with the image generator 10 that implements multiple-level occulting using control logic 40 and a mask buffer 50 in accordance with the present invention. The occulting apparatus 30 comprises the mask buffer 50 which is coupled to the control logic 40 and which is implemented in the polygon processor 11. The control logic 40 is coupled to a pixel occulting apparatus 51 or hybrid Z-buffer 51 implemented in the pixel processor 21. The control logic 40 comprises an obscurance manager 41, a region processor 42, an object processor 43, a polygon processor 44 and insertion logic 45 coupled as shown in FIG. 2. The mask buffer 50 is typically a buffer implemented in DRAM, for example.

The obscurance manager 41 comprises means for constructing and storing an obscurance mask in the the mask buffer 50. At the beginning of a processing frame, foreground entities are logically "ORed" into the mask buffer 50. When the entities that are processed extend beyond a predefined range from the viewpoint, construction of the mask ceases and is used to reject regions, objects and polygons that are fully obscured by the set of foreground entities that comprise the obscurance mask stored in the mask buffer 50.

The region processor 42 processes regions contained in the image to determine if they are obscured, rejects obscured regions, and transmits unobscured regions to the object processor 43. The object processor 43 processes objects within the unobscured regions to determine if they are obscured, rejects obscured objects, and transmits unobscured objects to the polygon processor 44. The polygon processor 44 processes polygons within the unobscured objects to determine if they are obscured, removes obscured polygons from the processing pipeline, and transmits unobscured polygons to the hybrid Z-buffer 51. The insertion logic 45 processes unobscured polygons and inserts them into the obscurance manager 41 which builds the obscurance mask in the mask buffer 50. The obscurance mask is used by the region, object, and polygon processors 42, 43, 44 to reject the obscured regions, objects, and polygons.

The present invention performs real-time occulting of all objects (entities) in an image scene, whether they are fixed or moving. The multiple-level occulting performed by the present invention is performed such that hidden area modules (large groups of objects in a geographic region), single objects, polygons, and pixels are sequentially filtered-out in real-time. The mask buffer 50 is implemented in the polygon processor 11 to provide the first three levels of occulting. The hybrid Z-buffer 51 is implemented in the pixel processor 21 to provide final pixel-level occulting. The pixel occulting apparatus 51 processes pixels contained within fully or partially unobscured polygons to determine if the pixels are obscured, and removes obscured pixels from the processing pipeline and transmits unobscured pixels to the video generator 13 for display.

In networked training systems, for example, a battlefield environment is one of high complexity with exceptionally high pixel processing requirements due to the need to look through layers of vegetation, smoke, haze, buildings and mountains from a ground vehicle, for example. The excessive amount of pixel processing due to the layers of rendered objects conventionally requires a large number of pixel processors, substantially increasing the required number of pixel processors. However, during high loads as much as 75% of the pixels are actually obscured from view by nearer objects. Consequently, the present invention is used to reject regions, objects, and polygons, early in the graphics processing pipeline (in the polygon processor 11) in order to reduce the number of required pixel processing computational elements in the image generator 10.

The occulting apparatus 30 rejects hidden objects early in the graphics processing pipeline. By rendering objects generally from front to back, entities that are completely hidden by nearer objects are detected. For maximum efficiency, this high level occulting is performed by the mask buffer 50 at three levels; regions, objects and polygons. Final, pixel-level occulting is performed with the hybrid Z-buffer 51.

The architectural and performance benefits of the multiple-level occulting apparatus 30 using a mask buffer 50 are as follows. The multiple-level occulting apparatus 30 using a mask buffer invention was developed for environments viewed from ground and near-ground vantage points. The i image generator architecture was simulated and positive results were obtained.

Figure 3:
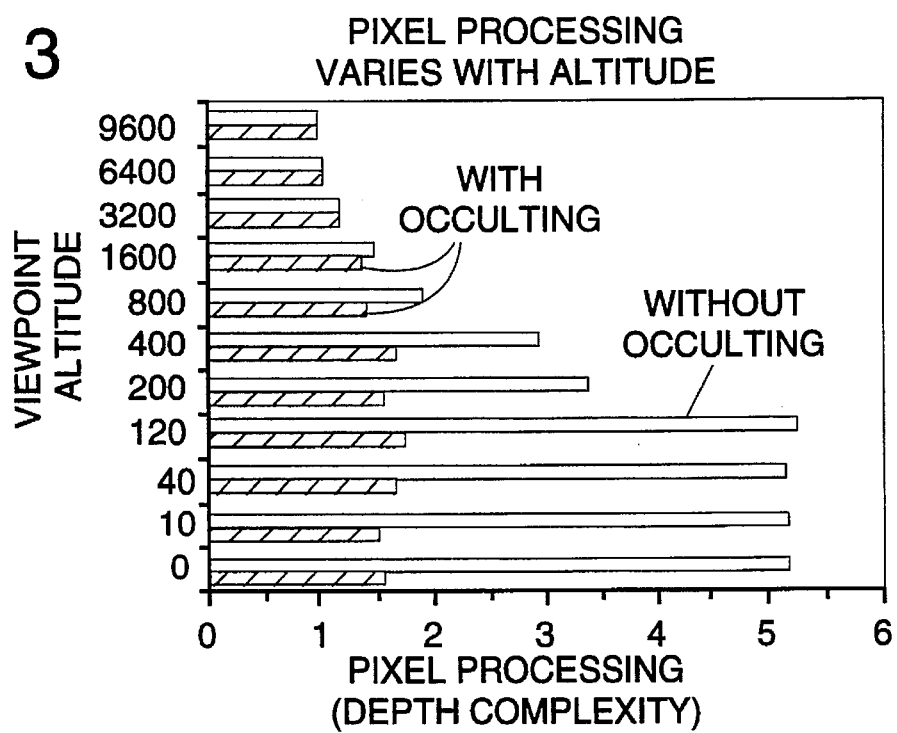
FIG. 3 illustrates that the present multiple-level occulting achieves nearly a 3-times decrease in pixel processing associated with ground based vantage points.

The multiple-level occulting apparatus 30 limits the pixel processing level over a range of image complexities. When depth complexity is low, such as from 2 to 3, the present method does not substantially reduce the required pixel processing. But as the depth complexity climbs to levels such as from 4 to 6, the present invention constrains the computational depth complexity to less than 3. FIG. 3 illustrates that the present multiple-level occulting achieves nearly a 3-times decrease in pixel processing associated with ground based vantage points. FIG. 3 shows the resulting depth complexity with respect to elevation of the vantage point. FIG. 3 demonstrates that the required pixel processing gets excessively high as the vantage point approaches the terrain level. With the multiple-level occulting, the computed depth complexity is contained to less than 3, becoming more effective as the actual depth complexity increases. This is exactly the desired effect needed to allow the image generator to be configured to render visually complex scenes with minimal pixel processing hardware.

Figure 4:
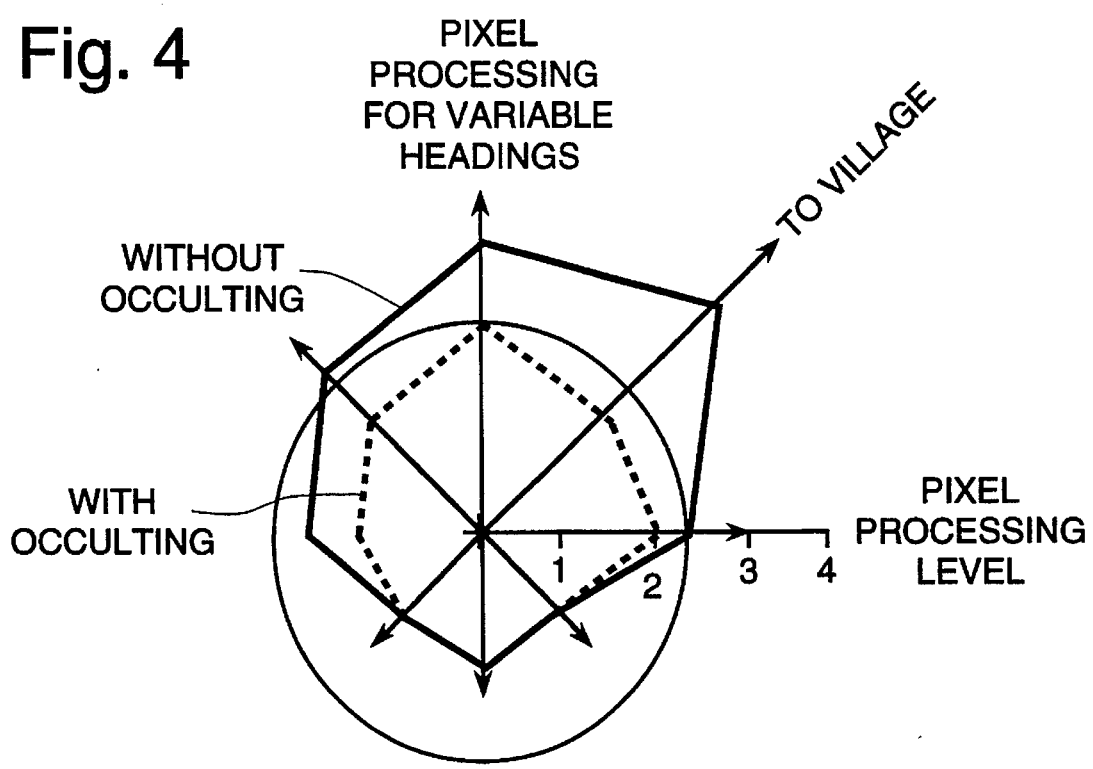
FIG. 4 illustrates that pixel processing associated with viewing direction is leveled or nominalized with the multiple-level occulting technique of the present invention.

FIG. 4 illustrates another case study, showing the depth complexity with respect to heading. More particularly, FIG. 4 illustrates that pixel processing associated with irregular loading is minimized with the multiple-level occulting technique of the present invention. FIG. 4 shows the depth complexity is low for many viewing directions. Data for cases without occulting are shown by the solid white bars, while those with occulting are shown by the cross-hatched bars. At headings looking towards a village, for example, the depth complexity becomes excessively high. Once again, in the cases where depth complexity is highest, the high-level occulting contains the pixel processing to a manageable level. Consequently, the higher the complexity of the environment, the better the present method works.

Thus there has been described a new and improved apparatus that provides for multiple-level occulting using a mask buffer that may be employed in an image generator. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. Occulting apparatus for use with an image generator that generates an image derived from an image database for display, said occulting apparatus comprising:

a mask buffer;

control logic coupled to the mask buffer and to the database for processing image data derived from the image database to construct and store an obscurance mask in the mask buffer, wherein foreground entities contained in the image data are logically ORed into the mask buffer with foreground entities of the image that have been previously stored in the mask buffer until the entities extend beyond a predefined range from a predetermined image viewpoint, and wherein the constructed and stored mask is used by the control logic to reject entities contained in subsequently processed image data that are fully obscured by the foreground entities that comprise the obscurance mask.

2. The occulting apparatus of claim 1 wherein the control logic further comprises:

region processing means coupled to the control logic for processing regions contained within the image data to determine if they are obscured, for removing obscured regions from the image data, and for outputting unobscured regions.

3. The occulting apparatus of claim 2 further comprising:

object processing means coupled to the control logic and to the region processing means for processing objects contained within unobscured regions to determine if they are obscured, for removing obscured objects from the image data, and for outputting unobscured objects.

4. The occulting apparatus of claim 3 further comprising:

polygon processing means coupled to the control logic and to the object processing means for processing polygons contained within the unobscured objects to determine if they are obscured, for removing obscured polygons from the image data, and for outputting unobscured polygons.

5. The occulting apparatus of claim 4 further comprising:

insertion means coupled to the polygon processing means and to the control logic for processing unobscured polygons and coupling them to the control logic to build the obscurance mask in the mask buffer.

6. The occulting apparatus of claim 4 further comprising:

pixel occulting means coupled to the control logic for processing pixels contained within unobscured polygons to determine if they are obscured, for removing obscured pixels from the image data, and for outputting unobscured pixels for display.

7. The occulting apparatus of claim 1 further comprising:

pixel occulting means coupled to the control logic for processing pixels contained within the unobscured foreground entities to determine if they are obscured, for removing obscured pixels from the image data, and for outputting unobscured pixels for display.

8. The occulting apparatus of claim 7 wherein the pixel occulting means comprises a hybrid Z-buffer.

* * * * *